United States Patent
Mori et al.

(10) Patent No.: US 12,140,519 B2
(45) Date of Patent: Nov. 12, 2024

(54) PARTICLE SIZE DISTRIBUTION MEASUREMENT DEVICE, PARTICLE ANALYSIS UNIT, PROGRAM FOR PARTICLE SIZE DISTRIBUTION MEASUREMENT DEVICE, AND BUBBLE REMOVAL METHOD

(71) Applicant: HORIBA, LTD., Kyoto (JP)

(72) Inventors: Tetsuya Mori, Kyoto (JP); Tomoki Aoyama, Kyoto (JP); Tatsuhito Nakamura, Kyoto (JP)

(73) Assignee: HORIBA, LTD., Kyoto (JP)

( * ) Notice: Subject to any disclaimer, the term of this patent is extended or adjusted under 35 U.S.C. 154(b) by 280 days.

(21) Appl. No.: 17/997,058

(22) PCT Filed: Mar. 17, 2021

(86) PCT No.: PCT/JP2021/010832
§ 371 (c)(1),
(2) Date: Oct. 25, 2022

(87) PCT Pub. No.: WO2021/220652
PCT Pub. Date: Nov. 4, 2021

(65) Prior Publication Data
US 2023/0168167 A1   Jun. 1, 2023

(30) Foreign Application Priority Data
Apr. 30, 2020 (JP) ................. 2020-080106

(51) Int. Cl.
*G01N 15/0205* (2024.01)
*G01N 15/00* (2024.01)
(Continued)

(52) U.S. Cl.
CPC ..... *G01N 15/0211* (2013.01); *G01N 15/0227* (2013.01); *G01N 15/1433* (2024.01);
(Continued)

(58) Field of Classification Search
CPC .......... G01N 15/0205; G01N 15/0211; G01N 15/0227; G01N 15/10; G01N 15/02;
(Continued)

(56) References Cited

U.S. PATENT DOCUMENTS 6,629,449 B1 * 10/2003 Kline-Schoder ..... A61B 8/4209
  73/19.1
6,687,395 B1 * 2/2004 Dietz ................. G01N 15/1433
  359/201.1
(Continued)

FOREIGN PATENT DOCUMENTS

JP   F101-259247 A   10/1989
JP   F05-273203 A    10/1993
(Continued)

OTHER PUBLICATIONS

Office Action dated Jun. 4, 2024 issued for the related Great Britain patent application No. 2215013.0. 3 pages.
(Continued)

*Primary Examiner* — Gordon J Stock, Jr.
(74) *Attorney, Agent, or Firm* — LUCAS & MERCANTI, LLP (57) ABSTRACT

In order to secure measurement reproducibility and a measurement accuracy by making it possible to automatically execute a bubble removal sequence as needed, the particle size distribution measurement device comprises a circulation flow channel through which the dispersion medium circulates, a flow cell arranged in the circulation flow channel, an imaging device that takes a particle image as being an image of a particle in the flow cell, and a bubble removal execution part that obtains bubble information which is obtained based on the particle image and which is about a bubble in the dispersion medium and that executes a bubble removal sequence to remove the bubble from the dispersion medium circulating in the circulation flow chan-
(Continued)

nel in case that the bubble information meets a predetermined condition.

11 Claims, 7 Drawing Sheets

(51) Int. Cl.
G01N 15/0227 (2024.01)
G01N 15/14 (2024.01)
G01N 15/1433 (2024.01)
G01N 21/47 (2006.01)

(52) U.S. Cl.
CPC ......... *G01N 15/1459* (2013.01); *G01N 21/47* (2013.01); *G01N 21/4788* (2013.01); *G01N 2015/0011* (2013.01); *G01N 2015/1486* (2013.01); *G01N 2015/1493* (2013.01); *G01N 2015/1497* (2013.01)

(58) Field of Classification Search
CPC .. G01N 15/075; G01N 15/14; G01N 15/1433; G01N 15/149; G01N 15/1459; G01N 2015/0238; G01N 2015/0011; G01N 2015/0053; G01N 2015/025; G01N 2015/1026; G01N 2015/1493; G01N 2015/1497; G01N 2015/0294; G01N 2015/0277; G01N 2015/1486; G01N 2015/0092; G01N 21/47; G01N 21/4788
See application file for complete search history.

(56) References Cited

U.S. PATENT DOCUMENTS

| | | | | |
|---|---|---|---|---|
| 8,441,624 B2* | 5/2013 | Matula | ................... | G01N 21/01 |
| | | | | 702/19 |
| 8,744,042 B2* | 6/2014 | Ohzu | ................... | G01N 23/223 |
| | | | | 378/46 |
| 8,986,322 B2* | 3/2015 | Kosar | ................ | A61B 17/3203 |
| | | | | 606/128 |
| 10,156,510 B2* | 12/2018 | Tabata | ................... | G01N 21/05 |
| 10,203,274 B2* | 2/2019 | Ruan | ..................... | A61B 5/0097 |
| 10,226,768 B2* | 3/2019 | Chiou | ............... | B01L 3/502761 |
| 10,232,368 B2* | 3/2019 | Chiou | ................ | G01N 29/2418 |
| 10,267,783 B2* | 4/2019 | Olson | ................ | G01N 33/1886 |
| 10,345,217 B2* | 7/2019 | Wanders | ............ | G01N 15/1433 |
| 10,859,487 B2* | 12/2020 | Knollenberg | ........... | G01F 1/704 |
| 11,119,030 B2* | 9/2021 | Otsuka | ............... | G01N 15/1484 |
| 11,131,627 B2* | 9/2021 | Bachalo | ................. | G01N 15/06 |
| 11,313,784 B2* | 4/2022 | Otsuka | ................. | G01N 15/1459 |
| 11,448,579 B2* | 9/2022 | Mori | ................. | G01N 21/4788 |
| 11,879,822 B2* | 1/2024 | Akiyama | ............. | G06V 10/255 |
| 11,898,949 B2* | 2/2024 | Ohuchi | ............. | G01N 15/0211 |
| 12,039,748 B2* | 7/2024 | Wen | ...................... | G01B 11/10 |
| 2010/0118298 A1 | 5/2010 | Bair et al. | | |
| 2012/0134559 A1* | 5/2012 | Suzuki | ............. | G01N 35/00613 |
| | | | | 382/128 |
| 2016/0084814 A1 | 3/2016 | Olsen | | |
| 2018/0075299 A1 | 3/2018 | Gerber et al. | | |
| 2021/0208048 A1 | 7/2021 | Akiyama et al. | | |

FOREIGN PATENT DOCUMENTS

| | | | | |
|---|---|---|---|---|
| JP | 2002-188991 A | | 7/2002 | |
| JP | 2003-207438 A | | 7/2003 | |
| JP | 2006-071329 A | | 3/2006 | |
| JP | 2018004450 A | * | 1/2018 | |
| WO | 2019-230628 A1 | | 12/2019 | |
| WO | WO-2019230624 A1 | * | 12/2019 | ......... G01N 15/0205 |

OTHER PUBLICATIONS

International Search Report for the corresponding patent application No. PCT/JP2021/010832 dated Jun. 1, 2021, with English translation.

* cited by examiner

PARTICLE IMAGE

PARTICLE SIZE DISTRIBUTION MEASUREMENT DEVICE, PARTICLE ANALYSIS UNIT, PROGRAM FOR PARTICLE SIZE DISTRIBUTION MEASUREMENT DEVICE, AND BUBBLE REMOVAL METHOD

CROSS REFERENCE TO RELATED APPLICATION

This Application is a 371 of PCT/JP2021/010832 filed on Mar. 17, 2021, which, in turn, claims priority of Japanese Patent Application No. 2020-080106 filed on Apr. 30, 2020, and the above applications are incorporated herein by reference.

FIELD OF THE ART

This invention relates to a particle size distribution measurement device, a particle analysis unit, a program used for particle size distribution measurement device, and a bubble removal method.

BACKGROUND ART

A conventional particle size distribution measurement device, as shown in a patent document 1, comprises a circulation flow channel wherein a dispersion medium, in which particles as being a measuring object are dispersed, circulates, and a flow cell arranged in the circulation flow channel. The particles in the flow cell are irradiated with light, and the particle size distribution is calculated based on the light intensity of the diffracted/scattered light generated by the irradiation of the light.

In such a configuration, if an air bubble is mixed in the flow cell, bubble-induced peaks appear in the particle size distribution to be measured, resulting in a decrease in a measurement accuracy. In order to secure the measurement accuracy, it is necessary to remove the air bubble from the circulation flow channel prior to initiating a measurement.

For this reason, in the past, the particle size distribution was displayed on a simple real-time monitor, which was checked by a user, and in case that the peak appeared or disappeared, for example, around 100 µm, it was determined that bubble was mixed in, and a bubble removal sequence to remove the bubble from the circulation flow channel was executed.

However, in the above-mentioned bubble removal method, since the user judges the inclusion of bubble, whether or not the bubble is removed to an extent that the measurement accuracy can be assured depends on a skill level of the user so that there is a risk that the measurement reproducibility or the measurement accuracy is lowered.

PRIOR ART DOCUMENTS

Patent Documents

Patent document 1: Japanese Unexamined Patent Application Publication No. 2006-71329

DISCLOSURE OF THE INVENTION

Problems to be Solved by the Invention

The present claimed invention is therefore made to solve the above-mentioned problems, and a main object of this invention is to secure measurement reproducibility and a measurement accuracy by automatically executing a bubble removal sequence in case that bubble is contained in the dispersion medium.

Means to Solve the Problems

More specifically, a particle size distribution measurement device in accordance with this invention is a particle size distribution measurement device that irradiates light on particles as being a measuring object that is dispersed in a dispersion medium, and calculates particle size distribution of the particles based on a light intensity signal indicating light intensity of diffracted/scattered light generated by irradiating the light, and is characterized by comprising a circulation flow channel through which the dispersion medium circulates, a flow cell arranged in the circulation flow channel, an imaging device that takes a particle image as being an image of a particle in the flow cell, and a bubble removal execution part that obtains bubble information which is obtained based on the particle image and which is about a bubble in the dispersion medium, and that executes a bubble removal sequence to remove the bubble from the dispersion medium circulating in the circulation flow channel in case that the bubble information meets a predetermined condition.

In accordance with the particle size distribution measurement device having this configuration, since the bubble removal execution part automatically executes the bubble removal sequence in case that the bubble information obtained based on the particle image meets the predetermined condition, it is possible to secure the measurement reproducibility and the measurement accuracy compared to a conventional case wherein a user determines inclusion of the bubble.

In case of judging the inclusion of the bubble by projecting the particle size distribution on a simple real-time monitor as described in the background art, since the bubble may not be detected if there are few bubbles, there might be a case that the measurement may have to be conducted again if bubble is found to be included after the measurement starts.

Furthermore, if the particle as the measuring object is about 100 µm in size, it is impossible to distinguish between the measuring object and the bubble by checking the particle size distribution displayed on the real-time monitor, resulting in a problem that it is impossible to determine the inclusion of the bubble.

Then, in order to make it possible to detect the bubble even though a number of the bubble is small regardless of the particle size of the particle as the measuring object and to reliably execute the bubble removal sequence in case that the bubble removal is necessary, it is preferable to further comprise a bubble distinction part that distinguishes whether or not the particle in the particle image is the bubble based on the particle image, and the bubble removal execution part obtains a number or a ratio of the particle determined as the bubble by the bubble distinction part as the bubble information, and executes the bubble removal sequence in case that the number or the ratio exceeds a predetermined threshold value.

In accordance with this configuration, since there is a remarkable difference in the particle in the particle image depending on whether it is the bubble or the particle as the measuring object, if bubble is mixed in, even though only a little, it is possible to distinguish the bubble based on this particle image, regardless of the particle size of the particle to be measured. In case that the number or the ratio of the particle, which is determined as the bubble, exceeds the predetermined threshold value, the bubble removal sequence is executed, thereby ensuring that the bubble removal sequence is executed in case that the bubble removal is necessary.

As a concrete embodiment of the bubble distinction part represented is the bubble distinction part that calculates roundness of the particle in the particle image and determines that the particle is the bubble in case that the roundness is greater than or equal to a reference value.

In accordance with this configuration, since the roundness of the bubble is high, whereas the particle as the measuring object cannot be round, it is possible to determine more certainly whether or not the particle in the particle image are the bubble.

In light of the fact that the higher the viscosity of the dispersion medium, the lower the roundness of the bubble, it is preferable that the bubble distinction part obtains a physical property value of the dispersion medium and changes the reference value by using the physical property value.

In accordance with this configuration, it is possible to set the reference value by taking into account the physical property value such as the viscosity of the dispersion medium so that bubble can be more accurately identified.

Conventional particle size distribution measurement device comprises an autosampler that introduces particles as the measuring object into a circulation flow channel. In accordance with this configuration, since it is possible to sequentially introduce a number of prepared measuring objects, at first glance, it tends to be thought of that once the prepared measuring objects are set in the autosampler, the introduction of the measuring objects and the measurement of the particle size distribution can be repeated automatically so that the time and effort required for the entire measurement process can be greatly reduced.

However, if the measurement is started while the bubble is contained in the dispersion medium after the measuring object is introduced, the measurement result could be a void. However, in an actual measurement, it is necessary to check whether or not the bubble is contained in the dispersion medium every time the measuring object is introduced. It would be difficult to consider this configuration contributes to great reduction of the time and effort required for the entire measurement process.

Then, in a configuration that further comprises an autosampler that introduces the particles as being the measuring object into the circulation flow channel, it is preferable that the bubble removal sequence is executed by the bubble removal execution part after introduction of the measuring object by the autosampler.

In accordance with this configuration, since it is possible to automate not only the introduction of the measuring object by the autosampler but also execution of the subsequent bubble removal sequence, a series of operations such as the introduction, the bubble removal and the measurement can be automated just by setting the prepared measuring object in the autosampler so that it is possible to significantly reduce the time and the effort required for the entire measurement process.

In order to make it possible to efficiently remove the bubble according to the number and the particle size of the bubble, it is preferable that the bubble removal sequence changes the operation content of the bubble removal sequence according to the bubble information.

As a concrete embodiment of changing the operation content of the bubble removal sequence represented is the particle size distribution measurement device that further comprises an ultrasonic vibration device that is arranged in the circulation flow channel and that operates in case that the bubble removal sequence is executed, and the bubble removal execution part changes a vibration intensity or a vibration time of ultrasonic vibration generated by the ultrasonic vibration device according to the bubble information.

It is preferable that a measurement sequence to measure the particle size distribution is configured to be executed after the bubble removal sequence, and further comprises a result storage part that links and stores the bubble information obtained in the series of the operations and the calculated particle size distribution.

In addition, a particle analysis unit in accordance with this invention is used for a particle size distribution measurement device that irradiates light on particles as being a measuring object that are dispersed in a dispersion medium, and calculates particle size distribution of the particles based on a light intensity signal indicating a light intensity of diffracted/scattered light generated by irradiating the light, and in a configuration wherein the particle size distribution measurement device comprises a bubble removal execution part that obtains bubble information which is obtained based on the particle image and which is about a bubble in the dispersion medium, and that executes a bubble removal sequence to remove the bubble from the dispersion medium circulating in the circulation flow channel in case that the bubble information meets a predetermined condition, and is characterized by comprising an imaging device that takes a particle image as being an image of the particle in a flow cell arranged in a circulation flow channel in which the dispersion medium circulates, a bubble distinction part that distinguishes whether or not the particle in the particle image is the bubble based on the particle image, and a counting part that counts a number or a ratio of the particles that are determined to be the bubble by the bubble distinction part, wherein the number or the ratio of the particles counted by the counting part is output to the bubble removal execution part as the bubble information.

Furthermore, a program for particle size distribution measurement device is a program used for a particle size distribution measurement device that irradiates light on particles as being a measuring object that are dispersed in a dispersion medium, and calculates particle size distribution of the particles based on a light intensity signal indicating a light intensity of diffracted/scattered light generated by irradiating the light, wherein the particle size distribution measurement device comprises a circulation flow channel through which the dispersion medium circulates, a flow cell arranged in the circulation flow channel, and an imaging device that takes a particle image as being an image of a particle in the flow cell, and is characterized by making a computer to produce a function as a bubble removal execution part that obtains bubble information which is obtained based on the particle image and which is about a bubble in the dispersion medium, and that executes a bubble removal sequence to remove the bubble from the dispersion medium circulating in the circulation flow channel in case that the bubble information meets a predetermined condition.

In addition, a bubble removal method in accordance with this invention is a bubble removal method used for a particle size distribution measurement device that irradiates light on particles as being a measuring object that are dispersed in a dispersion medium, and calculates particle size distribution of the particles based on a light intensity signal indicating a light intensity of diffracted/scattered light generated by irradiating the light, and the particle size distribution measurement device comprises a circulation flow channel through which the dispersion medium circulates, a flow cell arranged in the circulation flow channel, and an imaging device that takes a particle image as being an image of a particle in the flow cell, and is characterized by that a computer obtains bubble information which is obtained based on the particle image and which is about a bubble in the dispersion medium, and executes a bubble removal sequence to remove the bubble from the dispersion medium circulating in the circulation flow channel in case that the bubble information meets a predetermined condition.

It is possible to produce the same effects as that of the above-mentioned particle size distribution measurement device by the particle analysis unit and the program for the particle size distribution measurement device.

Effect of the Invention

In accordance with the above-mentioned present claimed invention, the bubble removal sequence is automatically executed in case that the bubble is contained in the dispersion medium so that it is possible to secure the measurement reproducibility and the measurement accuracy by this bubble removal sequence.

EXPLANATION OF THE CODES

100 . . . particle size distribution measurement device
L . . . circulation flow channel
AS . . . autosampler
X . . . ultrasonic vibration device
P . . . circulation pump
11 . . . static cell
12 . . . light source
13 . . . photodetector
14 . . . arithmetic device
20 . . . particle analysis unit
21 . . . cell for image
22 . . . light source
23 . . . imaging device
24 . . . information processing unit
31 . . . bubble distinction part
32 . . . counting part
33 . . . bubble removal execution part
34 . . . dispersion medium information reception part
41 . . . result storage part
Z . . . automatic bubble removal decision mechanism

BEST MODES OF EMBODYING THE INVENTION

One embodiment of this invention will be described below with reference to drawings.

Figure 1:
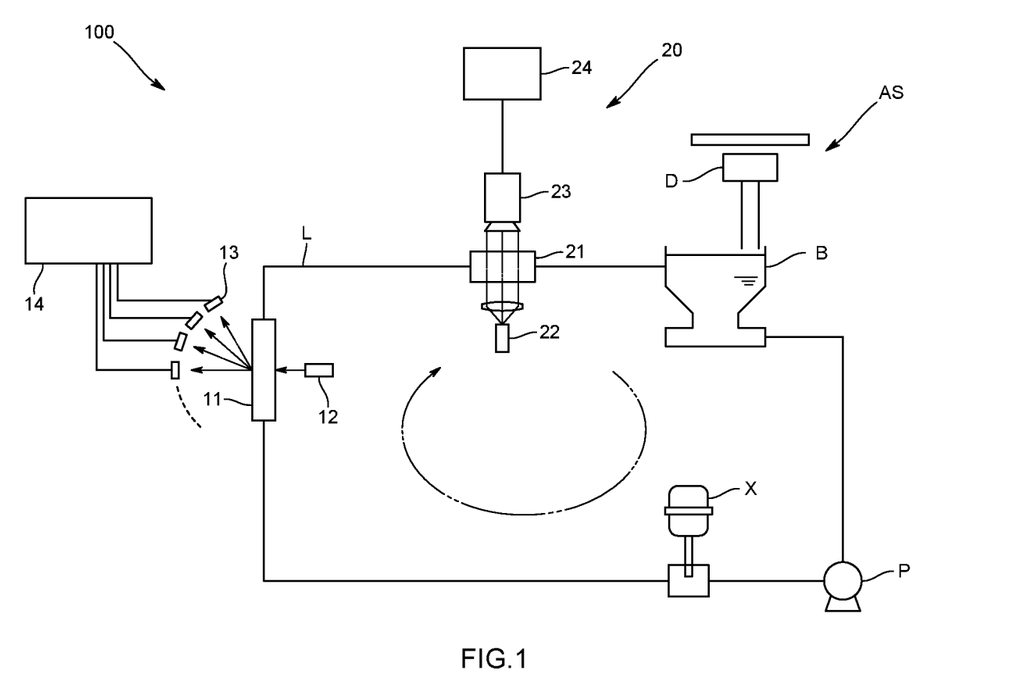
FIG. 1 A diagram schematically showing an overall configuration of a particle size distribution measurement device in accordance with this embodiment.

As shown in FIG. 1, a particle size distribution measurement device 100 in accordance with this embodiment measures particle size distribution based on a so-called static light scattering theory. Concretely, the particle size distribution measurement device 100 irradiates light to particles, as being an measuring object, dispersed in a dispersion medium and calculates the particle size distribution of the particles based on a light intensity signal indicating light intensity of diffracted/scattered light generated by the irradiation of the light.

The particle size distribution measurement device 100 comprises a circulation flow channel (L) in which a sample solution wherein the particles as being an measuring object are dispersed in a dispersion medium (water or alcohol), a scattering cell 11 arranged in the circulation flow channel (L), a light source 12 that irradiates the light to the particles in the scattering cell 11, a photodetector 13 that receives diffracted/scattered light generated by the irradiation of the light, and an arithmetic device 14 that obtains the light intensity signal of the received light and calculates the particle size distribution.

The scattering cell 11 is a flow cell in which the sample solution circulates, and in addition to this scattering cell 11, a circulation flow channel (L) is provided with a circulation pump (P) for circulating the sample solution and an ultrasonic vibration device (X) for separating agglomerated particles in case that the particles are agglomerated.

As shown in FIG. 1, the particle size distribution measurement device 100 in accordance with this embodiment further comprises an autosampler (AS), which introduces particles as the measuring object into the circulation flow channel (L).

Figure 2:
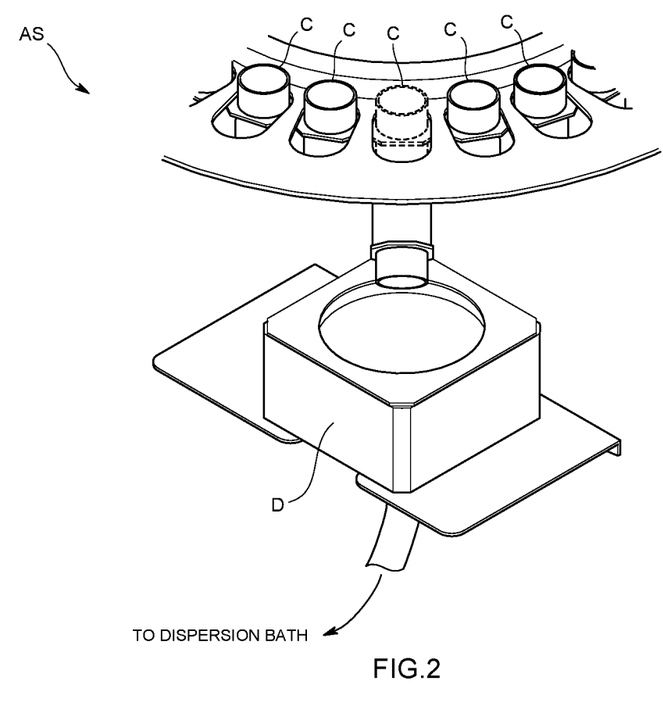
FIG. 2 A diagram schematically showing a configuration of an autosampler of this embodiment.

The autosampler (AS) is configured to sequentially feed multiple types of measuring objects into the circulation flow channel (L). Concretely, as shown in FIG. 2, the autosampler (AS) comprises multiple containers (C) where the measuring objects are housed, and a sample feeding part (D) into which the measuring objects are fed from the containers (C), and the measuring objects that are fed into the sample feeding part (D) are guided to a dispersion bath (B) that forms a part of the circulation flow channel (L). More concretely, the container (C) locating above the sample feeding part (D) is tilted to feed the measuring objects into the sample feeding part (D), and then the adjacent container (C) moves above the sample feeding part (D), and these movements are repeated. The autosampler (AS) may be configured to automatically adjust the concentration of the sample solution stored in the dispersion bath (B) by using, for example, a water level sensor, not shown in drawings. In addition, the particle size distribution measurement device 100 may also be configured to automatically adjust the concentration of the sample solution by using a water level sensor arranged in the dispersion bath (B).

In addition, the particle size distribution measurement device 100 of this embodiment is also capable of analyzing various characteristics of particles other than the particle size distribution, and concretely, the particle size distribution measurement device 100 further comprises a particle analysis unit 20 that measures physical property values indicating the physical properties of the particle.

The particle analysis unit 20 is used to determine whether or not the dispersion medium flowing at least in the circulation flow channel (L) contains a bubble.

A factor that may cause a bubble in the dispersion medium may be represented by bubbling due to surfactants introduced to prevent agglomeration of the particles as the measuring object, air remaining in the device, and the use of a highly viscous dispersion medium.

Concretely, as shown in FIG. 1, the particle analysis unit 20 comprises a cell for image 21 as being a flow cell arranged in the above-mentioned circulation flow channel (L), a light source 22 such as an LED that emits light on the particles in the cell for image 21, an imaging device 23 such as a camera that takes particle images, which are images of the particles in the cell for image 21, and an information processing unit 24 that analyzes the characteristics of the above-mentioned particles by, for example, image processing from the particle images obtained by the imaging device 23. The particle image is not limited to a still image but may also be a moving image.

Figure 3:
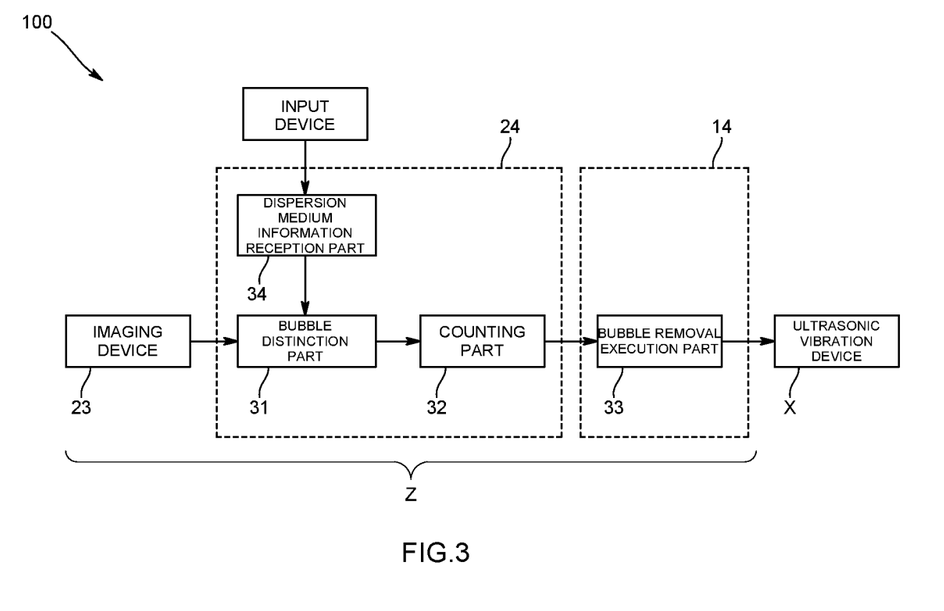
FIG. 3 A functional block diagram explaining functions of an information processing unit.

As shown in FIG. 3, the particle size distribution measurement device 100 of this embodiment is provided with a function as a bubble removal execution part 33 that executes a bubble removal sequence to remove an air bubble from the dispersion medium circulating in the circulation flow channel (L) in case that the particle information obtained based on the particle image meets a predetermined condition. In this embodiment, this bubble removal execution part 33 and the above-mentioned imaging device 23 are used to construct an automatic bubble removal decision mechanism (Z) for judging the necessity of executing the bubble removal sequence.

More concretely, in this embodiment, the above-mentioned arithmetic device 14 is a general-purpose or dedicated computer, physically speaking, comprising a CPU, a memory, and input/output interfaces or the like. The arithmetic device 14 is configured to function as at least the above-mentioned bubble removal execution part 33 by making the CPU and its peripheral devices work together according to predetermined programs stored in a predetermined area of the memory.

In addition, as shown in FIG. 3, the above-mentioned information processing unit 24 is a general-purpose or dedicated computer, physically speaking, comprising a CPU, a memory, and input/output interfaces or the like. The information processing unit 24 is configured to function as a bubble distinction part 31 and a counting part 32 or the like by making the CPU and its peripheral devices work together according to predetermined programs stored in a predetermined area of the memory. In this embodiment, the bubble distinction part 31 and the counting part 32 are also configured to function as the above-mentioned automatic bubble removal decision mechanism (Z).

Figure 4:
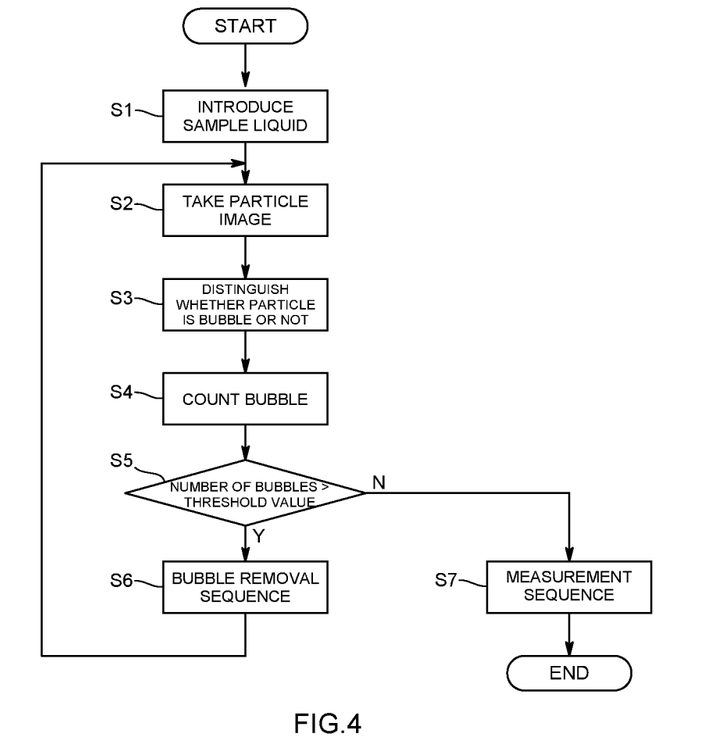
FIG. 4 A flowchart showing an operation of the particle size distribution measurement device of this embodiment.

The operation of the particle size distribution measurement device 100 in this embodiment will be explained below with reference to FIG. 3 and FIG. 4, as well as explaining each part.

[Sample Introduction Sequence]

First, when a measurement initiation signal is input to the particle size distribution measurement device 100, the dispersion medium is first introduced into the circulation flow channel (L). When the water level of the dispersion medium stored in the above-mentioned dispersion bath (B) reaches a predetermined level, the above-mentioned autosampler (AS) operates and the measuring object is automatically introduced into the circulation flow channel (L) (S1). In case that the particle size distribution measurement device 100 comprises no autosampler (AS), the measuring object may be manually introduced.

[Bubble Verification Sequence]

As mentioned above, after the dispersion medium and the measuring object are introduced into the circulation flow channel (L), the particle analysis unit 20 automatically verifies whether or not the sample solution, in which the particles as the measuring object are dispersed in the dispersion medium, contains a bubble.

Concretely, in this bubble verification sequence, first, the imaging device 23 takes the particle image as being an image of the particles in the cell for image 21, and this particle image is output from the imaging device 23 to the bubble distinction part 31 (S2).

When the bubble distinction part 31 obtains the particle image, the bubble distinction part 31 distinguishes whether or not the particle in the particle image is a bubble based on the particle image (S3).

Here, a difference in a way wherein the particle appears in the particle image (hereinafter referred to as "an image difference") occurs depending on whether the particle is the bubble or a particle as being the measuring object. For example, the bubble has a high degree of roundness (mostly almost a perfect circle), whereas the particle as being the measuring objects is almost impossible to be a perfect circle, so that the roundness of the particle in the particle image appears as the image differences.

Then, the bubble distinction part 31 is configured to determine whether or not the particle in the particle image is the bubble based on the image difference. In this embodiment, the roundness of the particle in the particle image is used to determine whether the particle is the bubble or not.

More concretely, the bubble distinction part 31 calculates the roundness of the particle in the particle image, compares the calculated roundness to a predetermined reference value, and determines that the particle is the bubble if the calculated roundness is equal to or greater than the reference value.

Meanwhile, the higher the viscosity of the dispersion medium is, the more the bubble contained in the dispersion medium elongates along the flow direction of the dispersion medium so that the roundness of the bubble in the particle image becomes low. More specifically, the roundness of the bubble is affected by the physical property value of the dispersion medium, such as the viscosity, the composition, the concentration, and the temperature.

Therefore, in this embodiment, as shown in FIG. 3, the physical property value such as the viscosity of the dispersion medium can be input through an input device such as a mouse, a keyboard, a touch panel, or the like and the input physical property value is accepted by the dispersion medium information reception part 34.

The bubble distinction part 31 of this embodiment is configured to obtain the physical property value received by the dispersion medium information reception part 34 and change the above-mentioned reference value using the physical property value. Concretely, a mode of the bubble distinction part 31 can be represented by that the reference value is calculated using a calculation formula or a look-up table with at least one physical property value (for example, viscosity) as a parameter, and more concretely, the bubble distinction part 31 can be represented by a mode wherein the higher the viscosity is, the lower the reference value is changed.

Next, the counting part 32 counts the number of the particle that is determined to be the bubble by the above-mentioned bubble distinction part 31 (S4). In other words, the counting part 32 counts the number of the particles whose circularity calculated by the bubble distinction part 31 is greater than or equal to the reference value. The counting part 32 may count the particles that are determined to be the bubble by the bubble distinction part 31 for a single particle image, or the counting part 32 may count the number of the bubble for a plurality of the particle images (a predetermined number of the particle images or the number of the particle images for a predetermined time). In addition, the counting part 32 may also calculate a ratio of the particles determined to be the bubble by the bubble distinction part 31 to a total number of the particles determined by the bubble distinction part 31. The counted number and/or the ratio of the particles is output to the bubble removal execution part 33 as information regarding the bubble obtained based on the particle image (hereinafter referred to as bubble information). The bubble information may include the particle size and the particle size distribution of the particles determined to be the bubble by the bubble distinction part 31.

When the bubble removal execution part 33 obtains the above-mentioned bubble information, the bubble removal execution part 33 determines whether or not the bubble information satisfies the predetermined condition (S5). The predetermined condition is set so as to make the measurement accuracy of this particle size distribution measurement device 100 secured, in other words, the bubble condition satisfies the predetermined condition in case that the measurement accuracy cannot be secured. More concretely, the bubble information is set so as to satisfy the predetermined condition in case that there is a high probability that a bubble peak will appear in the particle size distribution calculated by the above-mentioned arithmetic device 14.

Concretely, the bubble removal execution part 33 judges whether or not the number of the bubble (bubble information) obtained as the bubble information exceeds a predetermined threshold value (whether or not the predetermined condition is satisfied). In case that the number of the bubble exceeds the threshold value, the bubble removal sequence is executed to remove the bubble from the dispersion medium circulating in the circulation flow channel (L) (S6). In case that the ratio of the bubble is obtained as the bubble condition, it may be judged whether or not the ratio of the babbles exceeds the predetermined threshold value. More specifically, the bubble removal execution part 33 may be configured to execute the bubble removal sequence in case that either one or both of the number of the bubble and the ratio of the bubble exceed the predetermined threshold value.

[Bubble Removal Sequence]

When the bubble removal sequence is executed by the bubble removal execution part 33, the above-mentioned ultrasonic vibration device (X) operates to automatically remove the bubble from the sample liquid (the dispersion medium) flowing in the circulation flow channel (L).

As a more concrete example of the bubble removal sequence, first the circulation pump (P) is operated and then the ultrasonic vibration device (X) is operated, followed by that the ultrasonic vibration device (X) is stopped when a predetermined first time elapses, and then the circulation pump (P) is stopped when a predetermined second time elapses. The first time may be set to the same length as the second time, or to a shorter or longer time than the second time.

In this embodiment, the above-mentioned bubble removal execution part 33 is configured to change the operation of the bubble removal sequence according to the bubble information. In this embodiment, the vibration intensity or the vibration time of the ultrasonic vibration generated by the ultrasonic vibration device (X) is changed according to the bubble information. In case of changing the vibration time, the above-mentioned first time (more specifically, the time of one ultrasonic vibration) may be changed, the second time (more specifically, the interval time between the repeated ultrasonic vibrations) may be changed or both of the first time and the second time may be changed. Furthermore, the bubble removal execution part 33 may change the number of repetitions of the operation of the circulation pump (P) or the ultrasonic vibration device (X) according to the bubble information. In addition, the bubble removal execution part 33 may be configured to introduce a debubbling agent into the circulation flow channel (L) according to the bubble information.

More concretely, the bubble removal execution part 33 is configured to continuously or stepwise change the vibration intensity and/or the vibration time according to the number and the ratio of the bubble obtained as the bubble information. For example, the greater the number or the ratio of the bubble is, the stronger the vibration intensity is made or the longer the vibration time is made.

When the bubble-expulsion sequence in S6 is completed, the bubble-extracting sequence returns to S2 again in this embodiment, and the bubble-checking sequence until S5 is repeated.

[Measurement Sequence]

On the other hand, in case that one or both of the number and the ratio of the bubble are below or equal to the predetermined threshold value in S5, the measurement sequence is automatically started and the calculation of the particle size distribution by the above-mentioned arithmetic device 14 is performed (S7).

Once the particle size distribution of the measuring object is calculated in this way, the above-mentioned autosampler then introduces another measuring object into the circulation flow channel (L) (namely, returns to S1), and the above-mentioned series of operations is repeated.

In accordance with the above-mentioned configuration of the particle size distribution measurement device 100, since the particles in the particle image are distinguished as the bubble or not based on the roundness, even a small number of the bubble can be distinguished irrespective of the diameter of the particles as being the measuring object. Moreover, in case that the number or the ratio of the distinguished bubble exceeds the threshold value, since the bubble removal execution part 33 automatically executes the bubble removal sequence, it is possible to secure the measurement reproducibility and the measurement accuracy by executing the bubble removal sequence.

Furthermore, since the bubble distinction part 31 changes the reference value as being an object to be compared with the calculated roundness using, for example, a physical property value such as the viscosity of the dispersion medium, it is possible to more accurately distinguish whether or not the particles in the particle image are the bubble.

In addition, since the bubble removal execution part 33 changes the operation content of the bubble removal sequence according to the bubble information, it is possible to execute an efficient bubble removal sequence according to, for example, the number and the ratio of the bubble.

Furthermore, since the particle size distribution measurement device 100 comprises the autosampler (AS), it is possible to fully automate a series of the operations from the sample introduction sequence to the particle size distribution measurement sequence through the bubble confirmation sequence or the bubble removal sequence conducted as necessity requires. Moreover, since the introduction of the measuring object and the calculation of the particle size distribution are repeated sequentially, it is possible to automate the measurement of the multiple types of the measuring objects, thereby greatly reducing the labor required for measurement.

This invention is not limited to the above-mentioned embodiments.

For example, in the above-mentioned embodiment, the roundness of the particles in the particle image is used as an example of the image difference between the bubble and the particle to be measured, but an image difference that is different from the roundness may be used.

Figure 5:
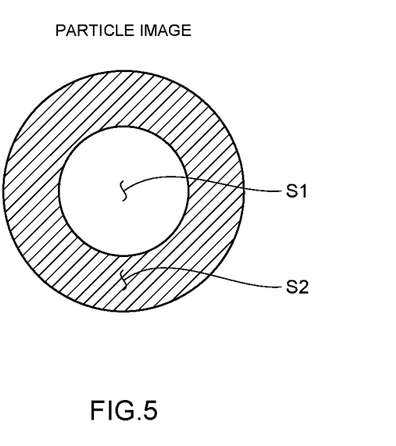
FIG. 5 A schematic diagram showing a particle in a particle image.

As one example of this, represented is the image difference caused by the difference in the refractive index between the bubble and the measuring object. Concretely, as shown in FIG. 5, since the particles in the particle image can be distinguished between a bright area (bright area S1) in a center part and a dark area (dark area S2) in its peripheral part, the size, the ratio and the area of the bright area S1 and the dark area S2 may be used as the image difference.

In addition, as another example, in case that the particle image is a moving image, since the bubble in this particle image rises up over time, a moving direction or a moving speed of the particle may be used as the image difference.

The bubble distinction part 31 may be configured to distinguish whether or not the particle in the particle image is the bubble by comparing one or more of the above-mentioned various image differences with the predetermined reference value.

In addition to judging whether or not the dispersion medium contains the bubble, the particle analysis unit 20 may be used to analyze the physical properties of the particles as the measuring object. Concrete examples of the physical property values include a particle size of the particle (an equivalent circle diameter of an area), an aspect ratio, a measurement magnification, a length, a width, a maximum distance, a periphery, a major axis, an area (actual measurement $\mu m^2$), an area (pixels), roundness, HS roundness, a convexity, solidity, a flat ratio, an elongation ratio, an average intensity, an intensity standard deviation, a center coordinate position, a particle size distribution, an agglomeration ratio or the like.

Figure 6:
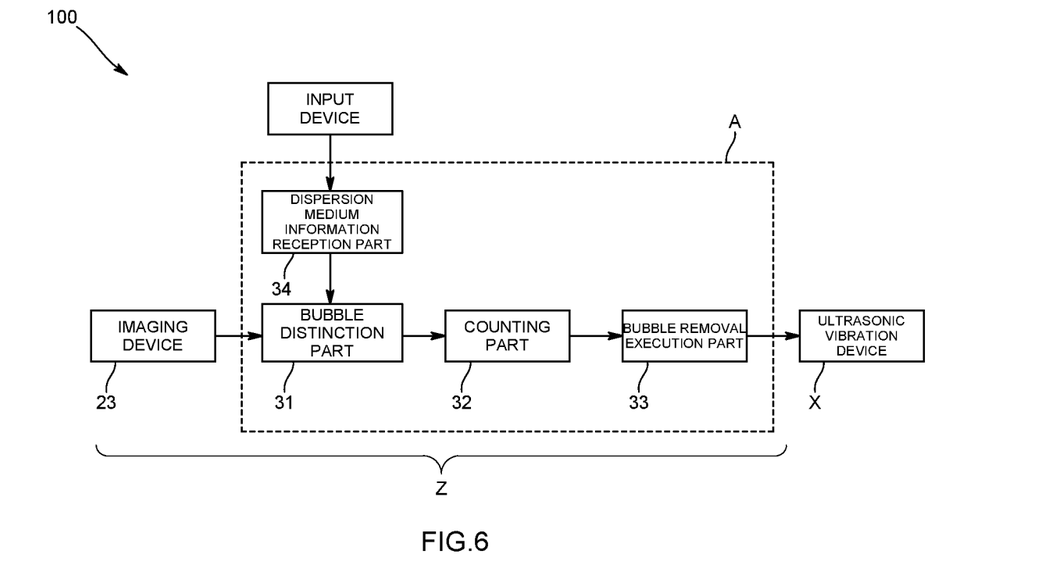
FIG. 6 A functional block diagram explaining functions of the information processing unit in accordance with a different embodiment.

Furthermore, in the above-mentioned embodiment, the arithmetic device 14 has the function as the bubble removal execution part 33, and the information processing unit 24 has the function as the bubble distinction part 31 and the counting part 32. However, as shown in FIG. 6, the functions of the bubble distinction part 31, the counting part 32, and the bubble removal execution part 33 may be produced by, for example, a common CPU such as the CPU of the arithmetic device 14 or the CPU of the information processing unit 24.

In addition, the functions as the bubble distinction part 31 and the counting part 32 of the above-mentioned embodiment may be provided in a computer different from the particle size distribution measurement device 100. In this case, the bubble removal execution part 33 may be configured to obtain the bubble information output from this external computer and to execute the bubble removal sequence in case that the obtained bubble information satisfies the predetermined condition. Namely, the automatic bubble removal decision mechanism (Z) does not comprise the bubble distinction part 31 and the counting part 32 but comprises a function as at least the bubble removal execution part 33.

The particle size distribution measurement device 100 of the above-mentioned embodiment is configured to return to S2 after the bubble removal sequence is completed, however, the measurement sequence may be executed automatically without returning to S2 after completion of the bubble removal sequence.

Furthermore, the bubble distinction part 31 may be configured to calculate the particle size of the bubble based on the particle image, and in this case, the bubble removal execution part 33 may be configured to obtain the bubble particle size as the bubble information and change the operation content of the bubble removal sequence according to the bubble information. Concretely, the embodiment may be represented by that the larger the bubble particle size calculated by the bubble distinction part 31 is, the greater the vibration intensity or the longer the vibration time of the ultrasonic vibration by the ultrasonic vibration device (X.)

Figure 7:
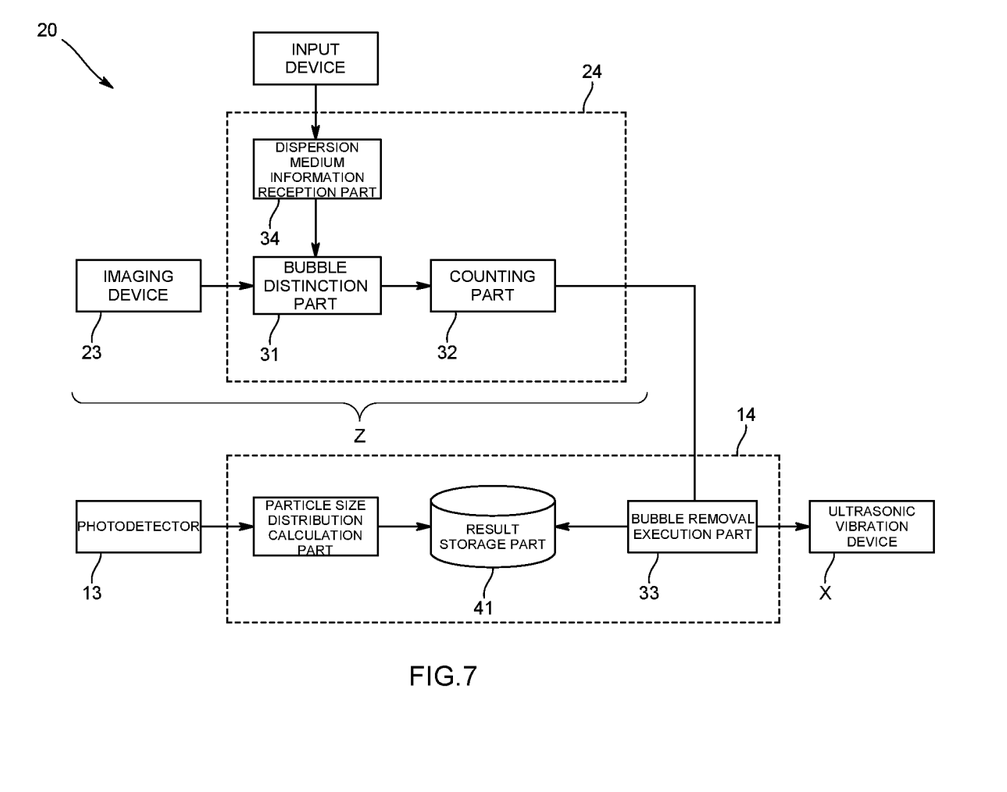
FIG. 7 A functional block diagram explaining functions of the information processing unit in accordance with a further different embodiment.

In addition, the particle size distribution measurement device 100 may further comprises a function as a result storage part 41 that links the bubble information obtained in the series of the operations with the measured particle size distribution and stores the result in a configuration in which the measurement sequence is executed after the bubble removal sequence (see FIG. 7). Although the result storage part 41 in FIG. 7 is provided in the arithmetic device 14, it can also be provided in the information processing unit 24 or in a predetermined area of a memory of other devices.

Concretely, the result storage part 41 may be represented by that combines the bubble information such as the number, the ratio, or the particle size of the bubble obtained by the bubble removal execution part 33 in the bubble confirmation sequence with the particle size distribution calculated in the measurement sequence corresponding to the bubble confirmation sequence and stores the result. In addition, the result storage part 41 may also store the number of the bubble removal sequences that are executed before the measurement sequence is started by linking the number of the bubble removal sequences with the particle size distribution.

In accordance with this configuration, it is possible to improve the traceability of the measurement results.

Furthermore, the bubble removal execution part 33 of the above-mentioned embodiment executes the bubble confirmation sequence before the measurement sequence, however, the bubble confirmation sequence may be executed during the execution of the measurement sequence.

In accordance with this arrangement, it is possible for the user to confirm whether or not the dispersion medium contains the bubble during the measurement of the particle size distribution, and when the number or the ratio of the bubble exceeds the predetermined value, if a function as a reporting part is provided to report this, it is possible for the user to resume the measurement before finishing the measurement so that the measurement efficiency can be improved.

In addition, the computer that performs the function as the bubble removal execution part 33 may be arranged at a remote location away from a location of the particle diameter distribution measurement. As an implementation of this case represented is a mode wherein the particle image taken by the imaging device is uploaded to a server, the computer locating at the remote location obtains the particle image, and the bubble removal execution part 33 performs its function based on the particle image.

In addition, the embodiment may be variously modified or combined without departing from a spirit of the present claimed invention.

POSSIBLE APPLICATIONS IN INDUSTRY

In accordance with the present claimed invention, it is possible to automatically execute the bubble removal sequence as needed to secure the reproducibility of the measurement and the measurement accuracy.

The invention claimed is:

1. A particle size distribution measurement device that irradiates light on particles as being a measuring object that is dispersed in a dispersion medium, and calculates particle size distribution of the particles based on a light intensity signal indicating light intensity of diffracted/scattered light generated by irradiating the light, comprising
a circulation flow channel through which the dispersion medium circulates,
a flow cell arranged in the circulation flow channel,
an imaging device that takes a particle image as being an image of a particle in the flow cell, and
a bubble removal execution part that obtains bubble information which is obtained based on the particle image and which is about a bubble in the dispersion medium, and that executes a bubble removal sequence to remove the bubble from the dispersion medium circulating in the circulation flow channel in case that the bubble information meets a predetermined condition.

2. The particle size distribution measurement Device described in claim 1, further comprising
a bubble distinction part that distinguishes whether or not the particle in the particle image is the bubble based on the particle image, wherein
the bubble removal execution part obtains a number or a ratio of the particle determined as the bubble by the bubble distinction part as the bubble information, and executes the bubble removal sequence in case that the number or the ratio exceeds a predetermined threshold value.

3. The particle size distribution measurement device described in claim 2, wherein
the bubble distinction part calculates roundness of the particle in the particle image and determines that the particle is the bubble in case that the roundness is greater than or equal to a reference value.

4. The particle size distribution measurement device described in claim 3, wherein
the bubble distinction part obtains a physical property value of the dispersion medium and changes the reference value by using the physical property value.

5. The particle size distribution measurement device described in claim 1, further comprising
an autosampler that introduces the particles as being the measuring object into the circulation flow channel, wherein
the bubble removal sequence is executed by the bubble removal execution part after introduction of the measuring object by the autosampler.

6. The particle size distribution measurement device described in claim 1, wherein
the bubble removal sequence changes an operation content of the bubble removal sequence according to the bubble information.

7. The particle size distribution measurement device described in claim 6, further comprising
an ultrasonic vibration device that is arranged in the circulation flow channel and that operates in case that the bubble removal sequence is executed, wherein
the bubble removal execution part changes a vibration intensity or a vibration time of ultrasonic vibration generated by the ultrasonic vibration device according to the bubble information.

8. The particle size distribution measurement device described in claim 1, wherein
a measurement sequence to measure the particle size distribution is configured to be executed after the bubble removal sequence, and further comprising
a result storage part that links and stores the bubble information obtained in the series of the operations and the calculated particle size distribution.

9. A particle analysis unit that is used for a particle size distribution measurement device that irradiates light on particles as being a measuring object that is dispersed in a dispersion medium, and calculates particle size distribution of the particles based on a light intensity signal indicating a light intensity of diffracted/scattered light generated by irradiating the light, wherein
in a configuration wherein the particle size distribution measurement device comprises a bubble removal execution part that obtains bubble information which is obtained based on the particle image and which is about a bubble in the dispersion medium, and that executes a bubble removal sequence to remove the bubble from the dispersion medium circulating in the circulation flow channel in case that the bubble information meets a predetermined condition, comprising
an imaging device that takes a particle image as being an image of the particle in a flow cell arranged in a circulation flow channel in which the dispersion medium circulates,
a bubble distinction part that distinguishes whether or not the particle in the particle image is the bubble based on the particle image, and
a counting part that counts a number or a ratio of the particles that are determined to be the bubble by the bubble distinction part, wherein
the number or the ratio of the particles counted by the counting part is output to the bubble removal execution part as the bubble information.

10. A storage medium storing a program for particle size distribution measurement device that is a program used for a particle size distribution measurement device that irradiates light on particles as being a measuring object that is dispersed in a dispersion medium, and calculates particle size distribution of the particles based on a light intensity signal indicating a light intensity of diffracted/scattered light generated by irradiating the light, wherein
the particle size distribution measurement device comprises a circulation flow channel through which the dispersion medium circulates, a flow cell arranged in the circulation flow channel, and an imaging device that takes a particle image as being an image of a particle in the flow cell, wherein
making a computer to produce a function as a bubble removal execution part that obtains bubble information which is obtained based on the particle image and which is about a bubble in the dispersion medium, and that executes a bubble removal sequence to remove the bubble from the dispersion medium circulating in the circulation flow channel in case that the bubble information meets a predetermined condition.

11. A bubble removal method used for a particle size distribution measurement device that irradiates light on particles as being a measuring object that is dispersed in a dispersion medium, and calculates particle size distribution of the particles based on a light intensity signal indicating a light intensity of diffracted/scattered light generated by irradiating the light, wherein
   the particle size distribution measurement device comprises a circulation flow channel through which the dispersion medium circulates, a flow cell arranged in the circulation flow channel, and an imaging device that takes a particle image as being an image of a particle in the flow cell, wherein
a computer obtains bubble information which is obtained based on the particle image and which is about a bubble in the dispersion medium, and executes a bubble removal sequence to remove the bubble from the dispersion medium circulating in the circulation flow channel in case that the bubble information meets a predetermined condition.

\* \* \* \* \*